United States Patent
Inoue et al.

(10) Patent No.: US 9,817,121 B2
(45) Date of Patent: Nov. 14, 2017

(54) RADAR APPARATUS AND METHOD OF DETERMINING SIGN OF VELOCITY

(71) Applicant: KABUSHIKI KAISHA TOYOTA CHUO KENKYUSHO, Nagakute-shi, Aichi-ken (JP)

(72) Inventors: Daisuke Inoue, Nagakute (JP); Tatsuya Yamashita, Nagakute (JP); Tadashi Ichikawa, Nagakute (JP); Satoru Kato, Nagakute (JP); Kazuo Hasegawa, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 407 days.

(21) Appl. No.: 14/581,637

(22) Filed: Dec. 23, 2014

(65) Prior Publication Data

US 2015/0185244 A1 Jul. 2, 2015

(30) Foreign Application Priority Data

Dec. 26, 2013 (JP) .................................. 2013-269793

(51) Int. Cl.
*G01P 3/36* (2006.01)
*G01S 17/08* (2006.01)
(Continued)

(52) U.S. Cl.
CPC ............... *G01S 17/08* (2013.01); *G01P 3/68* (2013.01); *G01S 7/4917* (2013.01); *G01S 17/36* (2013.01); *G01S 17/58* (2013.01)

(58) Field of Classification Search
CPC .......... G01P 3/68; G01S 7/4917; G01S 17/08; G01S 17/58
(Continued)

(56) References Cited

U.S. PATENT DOCUMENTS 6,229,474 B1    5/2001  Uehara
6,608,669 B2*   8/2003  Holton .................... G01S 17/58
                                                         356/28.5
(Continued)

FOREIGN PATENT DOCUMENTS

JP   S61-62885 A   3/1986
JP   2000-266853 A  9/2000
(Continued)

OTHER PUBLICATIONS

Apr. 5, 2016 Office Action issued in Japanese Patent Application No. 2013-269793.
(Continued)

*Primary Examiner* — Mark Hellner
(74) *Attorney, Agent, or Firm* — Oliff PLC

(57) ABSTRACT

A radar apparatus which can simply determine the sign of velocity of an object is provided. Laser light reflected by the object undergoes quadrature optical heterodyne detection performed by mixers, optical detectors, and a $\pi/2$ phase shifter, whereby I and Q component signals are output. A frequency analyzer performs FFT on a complex signal composed of the I component signal (real part) and the Q component signal (imaginary part) to thereby obtain its frequency spectrum. Since the frequency spectrum is calculated without being folded back even in a region where the frequency is negative, the sign of the Doppler frequency fd can be determined. When the Doppler frequency fd is positive, the sign of the velocity of the object is a direction toward the radar apparatus. When the Doppler frequency fd is negative, the sign of the velocity of the object is a direction away from the radar apparatus.

1 Claim, 3 Drawing Sheets

(51) Int. Cl.
*G01P 3/68* (2006.01)
*G01S 17/36* (2006.01)
*G01S 17/58* (2006.01)
*G01S 7/491* (2006.01)

(58) Field of Classification Search
USPC .......................................................... 356/28
See application file for complete search history.

(56) References Cited

U.S. PATENT DOCUMENTS

| | | | |
|---|---|---|---|
| 6,697,148 B1* | 2/2004 | Hopwood | G01S 17/10 356/28.5 |
| 7,038,617 B1* | 5/2006 | Ferrante | G01S 7/2923 342/159 |
| 7,706,695 B2 | 4/2010 | Hironishi et al. | |
| 2002/0105632 A1 | 8/2002 | Holton | |
| 2007/0230625 A1 | 10/2007 | Hironishi et al. | |
| 2008/0024756 A1* | 1/2008 | Rogers | G01P 5/26 356/5.09 |
| 2008/0100822 A1* | 5/2008 | Munro | G01S 17/10 356/4.01 |
| 2008/0114510 A1 | 5/2008 | Wilhelm et al. | |
| 2014/0327900 A1* | 11/2014 | Ritter | G01J 1/46 356/3 |

FOREIGN PATENT DOCUMENTS

| | | |
|---|---|---|
| JP | 2000-338229 A | 12/2000 |
| JP | 2008-514938 A | 1/2007 |
| JP | 3872082 B2 | 1/2007 |
| JP | 2007-274235 A | 10/2007 |
| JP | 2009-192427 A | 8/2009 |
| WO | 03100458 A1 | 12/2003 |

OTHER PUBLICATIONS

Nov. 8, 2016 Office Action issued in Japaense Patent Application No. 2013-269793.

* cited by examiner

FIG. 1
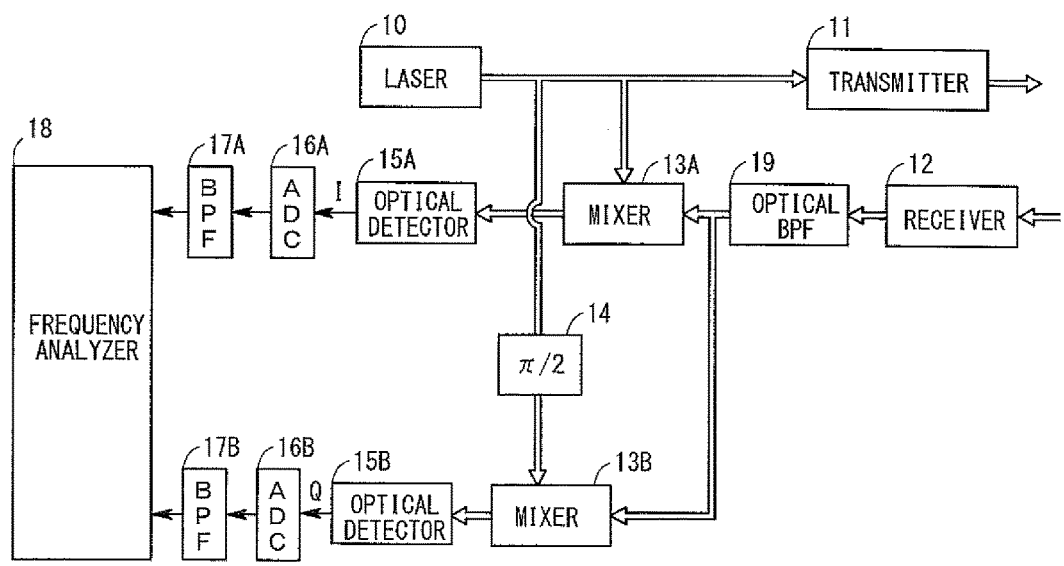
FIG. 2A
FIG. 2B
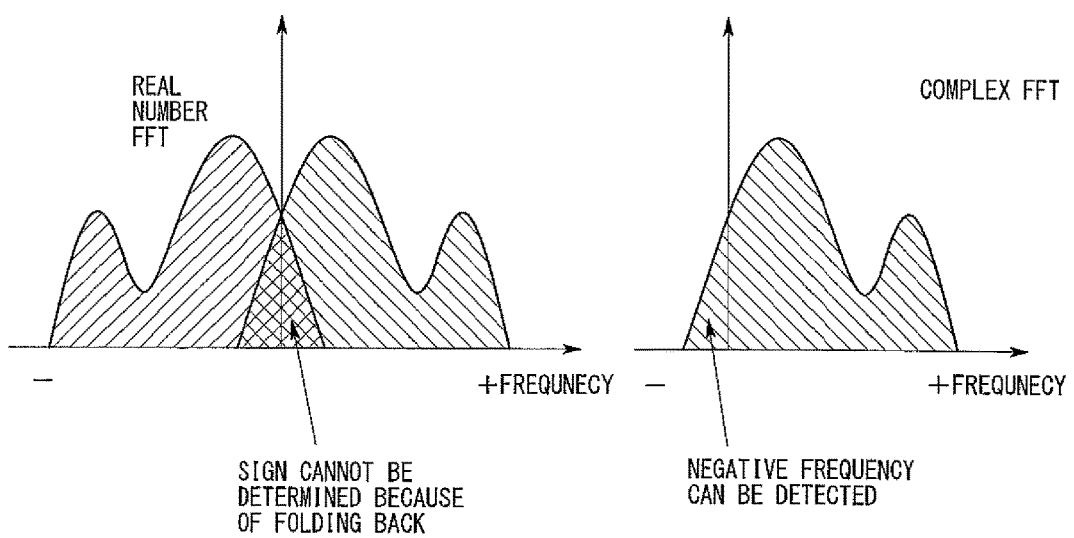

RADAR APPARATUS AND METHOD OF DETERMINING SIGN OF VELOCITY

BACKGROUND OF THE INVENTION

Field of the Invention

The present invention relates to a radar apparatus which radiates laser light toward an object, detects the laser light reflected from the object, and measures or determines the sign of velocity of the object.

The term "velocity" used herein is scalar and refers to the magnitude of an orthogonal projection vector obtained by projecting a relative velocity vector of an object to the radar apparatus onto the optical axis of laser light. Therefore, the direction in which the object is present can be determined by the direction of a laser beam, and the magnitude of the orthogonal projection vector is the velocity.

Background Art

There has been conventionally known a radar apparatus (LIDAR) which emits laser light toward an object, and receives and analyzes the laser light reflected from the object, to thereby measure the distance and velocity of the object.

Use of such a radar apparatus in vehicles has been promoted. For example, a radar apparatus is mounted on a vehicle so as to detect the distance and velocity of an object such as a pedestrian or a vehicle travelling in front of the radar-mounted vehicle, to thereby avoid collision with the object. In such a case, the sign of velocity (whether the object is approaching the vehicle or is moving away from the vehicle) is very important information.

According to one method, velocity is obtained through measurement of a Doppler frequency fd. In such a case, the sign of the Doppler frequency fd must be determined in order to determine the sign of velocity. Conventionally, laser light is FSK modulated through use of AOM (Acoust-Optic Modulator) in order to determine the sign of Doppler frequency fd.

For example, in Patent Document 1, the sign of the Doppler frequency fd is determined as follows. Laser light having a frequency f0 is FSK modulated so as to modulate the frequency to f0+f1 and f0+f2. The frequency-modulated laser light is radiated toward an object, and reflection light from the object is received. The received laser light is mixed with local light with the frequency f0 for optical heterodyne detection so as to convert the received light to an electric signal whose frequency assumes two values, fd+f1 and fd+f2. Subsequently, the electric signal is multiplied by a signal whose frequency is (f1+f2)/2 so as to convert the electric signal to a signal whose frequency assumes two values, (f2−f1)/2−fd and (f2−f1)/2+fd. Further, the resultant respective signals undergo quadrature detection with a signal whose frequency is (f2−f1)/2, whereby an I component and Q component are obtained, each of which has frequencies fd and −fd. Subsequently, FFT (fast Fourier transform) is performed on the IQ component signal which is equal to I(t)+jQ(t) so as to calculate its frequency spectrum and obtain the Doppler frequency fd. Since quadrature detection is performed, the sign of the Doppler frequency fd can be determined, whereby the sign of velocity can be determined from the sign of the Doppler frequency fd.

Patent Document 1: Japanese Patent No. 3872082

Hover, since AOM is expensive, there has been a problem in that such a radar apparatus entails high cost. Also, since AOM utilizes surface acoustic waves, its integration is difficult. Therefore, reducing the cost and size of a radar apparatus has been difficult.

SUMMARY OF THE INVENTION in view of the forgoing, an object of the present invention is to provide a radar apparatus which can determine the sign of velocity at low cost.

According to one aspect of the present invention, there is provided a radar apparatus which radiates laser light toward an object and detects and analyzes the laser light reflected by the object. The radar apparatus comprises detector which includes first detector for mixing received laser light and pre-transmission laser light so as to perform optical heterodyne detection, and second detector for shifting the phase of one of the received laser light and the pre-transmission laser light by 90° and mixing the phase-shifted one laser light with the other laser light so as to perform optical heterodyne detection; and frequency analyzer for producing a complex signal while using electric signals output from the first detector and the second detector as an I component signal and a Q component signal, obtaining a Doppler frequency fd through frequency analysis of the complex signal, and determining the sign of velocity of the object from the sign of the Doppler frequency fd.

A portion of the radar apparatus for processing laser light may be constituted by an optical integrated circuit. In this case, the radar apparatus of the present invention can be realized at low cost.

The radar apparatus may further comprise devices for distance measurement.

For example, the radar apparatus may further comprise transmitter for radiating toward the object laser light whose intensity is modulated by a periodic signal having a frequency f0 lower than a lowest frequency at which the Doppler frequency fd produced as a result of movement of the object can be measured; and phase difference detector for detecting a phase difference between the periodic signal and a component of the electric signal from the detector, the frequency of the component being f0, to thereby measure a distance to the object.

Alternatively, the radar apparatus may further comprise transmitter for radiating laser light toward the object, the laser light being frequency-modulated such that the frequency of the laser light changes continuously, wherein the frequency analyzer further includes a device for producing a complex signal while using electric signals output from the first detector and the second detector as an I component signal and a Q component signal, and measuring a frequency shift corresponding to a distance to the object through frequency analysis of the complex signal, to thereby measure the distance to the object.

According to another aspect of the present invention, there is provided a method of determining the sign of velocity of an object by radiating laser light toward the object and detecting and analyzing the laser light reflected by the object. The method comprises mixing received laser light and pre-transmission laser light so as to perform optical heterodyne detection to thereby generate an I component signal; shifting the phase of one of the received laser light and the pre-transmission laser light by 90° and mixing the phase-shifted one laser light with the other laser light so as to perform optical heterodyne detection to thereby generate a Q component signal; and obtaining a Doppler frequency fd through frequency analysis of a complex signal composed of the I component signal and the Q component signal, and determining the sign of velocity of the object from the sign of the Doppler frequency fd.

According to the present invention, the sign of velocity of an object can be determined simply at low cost. Since the present invention uses optical heterodyne detection, the sign of velocity can be determined with high sensitivity.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which:

FIG. 1 is a diagram showing the configuration of a radar apparatus according to a first embodiment;

FIGS. 2A and 2B are charts showing examples of frequency spectra;

DETAILED DESCRIPTION OF PREFERRED EMBODIMENTS

Figure 3:
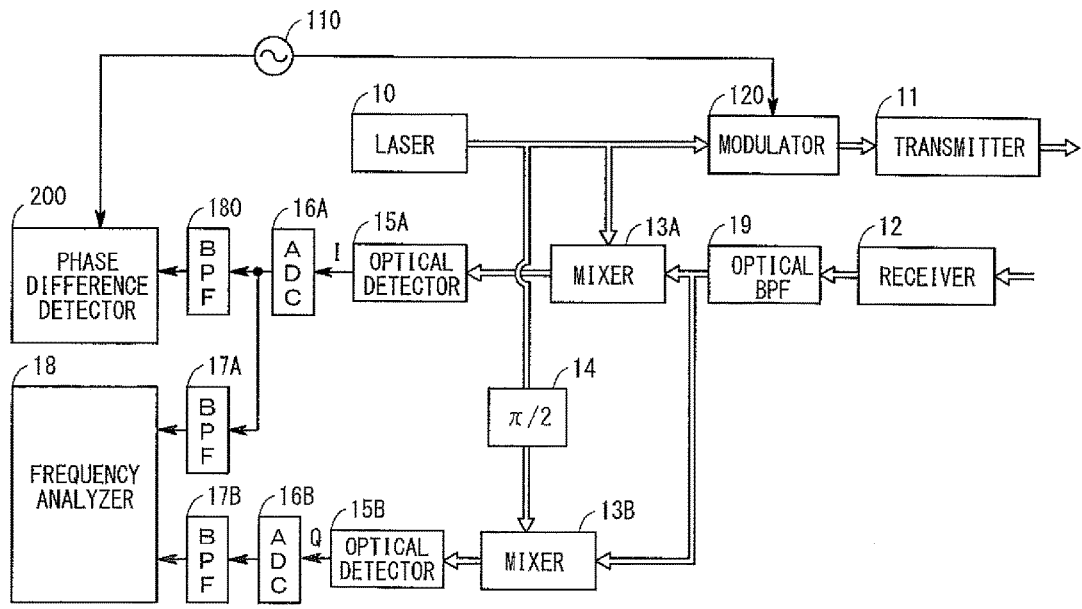
FIG. 3 is a diagram showing the configuration of a radar apparatus according to a second embodiment.

Specific embodiments of the present invention will next be described with reference to the drawings. However, the present invention is not limited to the embodiments.

First Embodiment

FIG. 1 is a diagram showing the configuration of a radar apparatus according to a first embodiment. In FIG. 1, arrowed double lines show paths for laser light, and arrowed single lines show paths for electric signals. As shown in FIG. 1, the radar apparatus of the first embodiment is composed of a laser 10, transmitter 11, receiver 12, mixers (couplers, hereinafter the same) 13A and 13B, a $\pi/2$ phase shifter 14, optical detectors 15A and 15B, ADCs (analog-to-digital conversion circuits) 16A and 16B, BPFs (band-pass filters) 17A and 17B, and frequency analyzer 18. Below, these components will be described in detail.

The laser 10 radiates laser light which is continuous light having a wavelength of 1550 nm. The laser light output from the laser 10 is split into two light beams, one of which is input to a mixer 13A and the other of which is input to the $\pi/2$ phase shifter 14.

Although the wavelength of the laser light is not limited to 1550 nm, it is desired that the wavelength be set to a range of 800 to 1700 nm in consideration of measurement accuracy, easiness of generation, influences on the human body, etc.

The transmitter 11 is an optical system for radiating the laser light from the laser 10 toward an object, and is composed of an optical waveguide, a lens, or the like which guides the laser light in a predetermined direction.

The receiver 12 is an optical system for condensing and receiving the laser light reflected by the object, and is composed of an optical waveguide, a condenser lens, a circuit for correcting the state of polarization of the received laser light, etc. After passing through an optical BPF 15, the received laser light is split into two light beams which are input to the mixers 13A and 13B. The optical BPF 15 is provided so as to cut disturbing light, etc. to thereby improve the CN ratio and increase the measurement accuracy.

Notably, the transmitter 11 and the receiver 12 may be replaced with transmitter/receiver which performs both of transmission and reception of light through use of an optical circulator or the like.

The laser light from the laser 10 and the laser light through the optional BPF 19 from the receiver 12 are input to the mixer 13A. The mixer 13A mixes the two laser lights and outputs the resultant light to the optical detector 15A.

The $\pi/2$ phase shifter 14 shifts the phase of the laser light input from the laser 10 by 90°, and outputs the phase-shifted laser light.

The laser light from the $\pi/2$ phase shifter 14 and the laser light through the optional BPF 19 from the receiver 12 are input to the mixer 13B. The mixer 13B mixes the two laser lights and outputs the resultant light to the optical detector 15B.

The optical detectors 15A and 15B receive the laser lights from the mixers 13A and 13B. The optical detectors 15A and 15B convert the received laser lights to electric signals by means of optical heterodyne detection, and output the electric signals. The optical detectors 15A and 15B are photodiodes. The electric signals output from the optical detectors 15A and 15B are input to the ADCs 16A and 16B, respectively.

The ADCs 16A and 16B convert the analog signals from the optical detectors 15A and 15B to digital signals, and output the digital signals. The digital signals output from the ADCs 16A and 16B are input to the frequency analyzer 18 through the BPFs 17A and 17B.

Each of the BPFs 17A and 17B is a filter which allows passage of signals within a frequency band near the Doppler frequency and which cuts or blocks signals in other frequency bands. This improves the accuracy in calculating the Doppler frequency by the frequency analyzer 18 to thereby improve the accuracy in measuring the velocity of the object.

The frequency analyzer 18 performs FFT (Fast Fourier Transform) on the input electric signals, detects the Doppler frequency from the obtained frequency spectrum, and measures the velocity of the object and the sign of the velocity. Here as described above the term "velocity" is scalar and refers to the magnitude of an orthogonal projection vector obtained by projecting a relative velocity vector of an object to the radar apparatus the optical axis of laser light. Therefore, the direction in which the object is present can be determined by the direction of a laser beam, and the magnitude of the orthogonal projection vector is the velocity. The details of operation of the frequency analyzer 18 will be described later. The BPFs 17A and 17B and the frequency analyzer 18 are realized by, for example, a DSP (digital signal processor).

Next, operation of the radar apparatus according to the first embodiment for measuring the velocity of an object and the sign of the velocity will be described in detail.

The laser light output from the laser 10 is caused to propagate toward the object outside the radar apparatus by the transmitter 11. The laser light reflected by the object is received by the receiver 12. In the case where the object is moving at a relative speed v, i.e., the orthogonal projection vector on the optical axis of the laser light, in relation to the radar apparatus, the frequency of the received laser light has shifted due to the Doppler effect. When the Doppler frequency is fd and $\omega d = 2\pi \cdot fd$, $v = c \cdot \omega d/(2\omega)$ stands, where c is the velocity of light, and $\omega$ is the angular frequency of the laser light. Notably, the sign of $\omega d$ becomes positive when the object approaches the radar apparatus and negative when the object moves away from the radar apparatus.

The laser light received by the receiver 12 undergoes quadrature optical heterodyne detection performed by the mixers 13A and 13B and the optical detectors 15A and 15B. Namely, the laser light from the laser 10 and the laser light from the receiver 12 are mixed together for optical heterodyne detection. As a result, the optical detector 15A generates and outputs an I component signal which is an electric signal containing the component of cos(ωd·t). Also, the laser light obtained by shifting the phase of the laser light from the laser 10 by 90° is mixed with the laser light from the receiver 12 so as to perform optical heterodyne detection. As a result, the optical detector 15B generates and outputs a Q component signal which is an electric signal containing the component of sin(ωd·t). Since optical heterodyne detection is used, the velocity of the object and the sign of the velocity can be obtained with high sensitivity.

The I component signal and the Q component signal are converted to digital signals by the ADCs 16A and 16B, and the digital signals are input to the frequency analyzer 18 through the BPFs 17A and 17B which allow passage of predetermined frequency components only.

The frequency analyzer 18 produces a complex signal composed of the I component signal (real part) and the Q component signal (imaginary part), and performs FFT (fast Fourier transform) on the complex signal so as to obtain its frequency spectrum. When a real signal is subjected to FFT, its spectrum is folded back at a point where the frequency is 0. Therefore, the sign of the frequency cannot be determined (see (FIG. 2A). In contrast, the frequency analyzer 18 performs FFT on the complex signal. Therefore, the frequency spectrum is calculated without being folded back even in a region where the sign of the frequency is negative (see (FIG. 2B). Accordingly, the sign (positive or negative) of the Doppler frequency fd can be determined from the obtained frequency spectrum.

The velocity of the object and the sign of the velocity are obtained as follows from the frequency spectrum obtained by the frequency analyzer 18. First, the peak position of the frequency spectrum is detected. Subsequently, the Doppler frequency fd is obtained from the peak position of the frequency spectrum, and the velocity v of the object is calculated by a formula of $v=\lambda \cdot fd/2$, where $\lambda$ is the wavelength of the laser light. Also, the sign of the velocity of the object is determined from the sign of the Doppler frequency fd. When the sign of the Doppler frequency fd is positive, the sign of the velocity of the object is a direction toward the radar apparatus, and when the sign of the Doppler frequency fd is negative, the sign of the velocity of the object is a direction away from the radar apparatus.

As described above, the radar apparatus of the first embodiment can determine the sign of the velocity of the object simply with high sensitivity.

Second Embodiment

FIG. 3 is a diagram showing the configuration of a radar apparatus according to a second embodiment. The radar apparatus of the second embodiment is realized by adding the following components to the radar apparatus of the first embodiment.

As shown in FIG. 3, the radar apparatus of the second embodiment differs from the radar apparatus of the first embodiment in that an oscillator 110, a modulator 120, a BPF 180, and phase difference detector 200 are added so as to measure the distance between the radar apparatus and an object in addition to the velocity of the object. In the below, components different from those of the first embodiment will be described, and operation of the radar apparatus of the second embodiment will be described.

The oscillator 110 generates a periodic signal which is a cosine wave having a frequency of 100 kHz. This periodic signal is input to the modulator 120 and the phase difference detector 200.

The periodic signal output from the oscillator 110 is not limited to such a cosine wave, and the oscillator 110 may generate an arbitrary signal so long as the generated signal can be used as a periodic signal. For example, an arbitrary periodic signal, such as a triangular wave, a rectangular wave, or a saw-tooth wave, can be used. However, it is preferred to use a cosine wave so as to increase measurement sensitivity and measurement accuracy, because the frequency band of the electric signal can be narrowed further by the BPF 180 in the latter stage.

The frequency of the periodic signal is determined in accordance with the velocity of an object to be measured by the radar apparatus. Specifically, the frequency of the periodic signal is set to a frequency sufficiently lower than the Doppler frequency fd produced as a result of movement of the object. The expression "frequency sufficiently lower" means that the frequency of the periodic signal is lower than the Doppler frequency fd by an amount which allows the frequency of the periodic signal and the Doppler frequency fd to be separated from each other through use of a filter. As a result of setting the frequency of the periodic signal as described above, the simultaneous measurement of distance and velocity is facilitated.

For example, in the case where the radar apparatus is mounted on a vehicle as an on-vehicle radar, the object is a pedestrian or a vehicle travelling in front of the radar-mounted vehicle. Since their relative velocity in relation to the vehicle (relative velocity v in relation to the radar apparatus) is about 0.5 m/s to 50 m/s, the Doppler frequency fd is 0.65 to 65 MHz. Here, the Doppler frequency fd is determined by a formula of $fd=2v/\lambda$, where $\lambda$ is the wavelength of the laser light. Accordingly, the frequency of the periodic signal is set to a frequency sufficiently lower than 650 kHz; for example, the frequency of the periodic signal is set to 500 kHz or lower. However, when the frequency of the periodic signal is lower than 50 kHz, measurement accuracy deteriorates. Therefore, a frequency lower than 50 kHz is not desirable. In the first embodiment, the frequency of the periodic signal is set to 100 kHz in consideration of the above-described range and the line width of the laser.

The modulator 120 modulates the intensity of the laser light with the periodic signal from the oscillator 110, and outputs the modulated laser light. The output laser light is input to the transmitter 11. The laser light from the laser 10 is input to the modulator 120, the mixer 13A, and the π/2 phase shifter 14. The modulator 120 receives the laser light from the laser 10 and the periodic signal from the oscillator 11.

Like the radar apparatus of the first embodiment, the laser light received by the receiver 12 is passed through the optical BPF 19 and is input to the mixers 13A and 13B for quadrature optical heterodyne detection. As a result, an I component signal and a Q component signal are output from the optical detectors 15A and 15B, respectively. However, unlike the first embodiment, the I and Q component signals contain not only the frequency component of the Doppler frequency fd but also the frequency component of the periodic signal.

The I component signal (analog signal) from the optical detector 15A is converted to a digital signal by the ADC 16A, and the digital signal is split into two signals, one of which is supplied to the BPF 180 and the other of which is supplied to the BPF 17A.

The BPF 180 is a filter which allows signals in a frequency band (e.g., 90 to 110 kHz) near the frequency of the periodic signal; i.e., 100 kHz, and cuts or blocks signals in other frequency bands. The I component signal having passed through the BPF 180 is input to the phase difference detector 200.

Since the frequency of the periodic signal is sufficiently lower than the Doppler frequency fd, the frequency of the periodic signal and the Doppler frequency fd can be separated adequately by the BPF 180. Therefore, of the frequency components of the I component signal, only the frequency component of the periodic signal passes through the BPF 180, and the frequency component of the Doppler frequency fd is cut or blocked by the BPF 180.

The phase difference detector 200 receives the I component signal from the BPF 180 and the periodic signal from the oscillator 110. The phase difference detector 200 detects the phase difference between the received I component signal and the received periodic signal through synchronous detection performed using a lock-in amplifier, and measures the distance of the object from the phase difference. Since a lock-in amplifier is used and the I component signal from the BPF 180 contains the frequency component of the periodic signal only, the distance can be measured accurately. Notably, the radar apparatus may be configured to detect the phase difference between the periodic signal and the Q component signal from the optical detector 15B rather than the I component signal from the optical detector 15A.

The I component signal and the Q component signal from the BPFs 17A and 17B are input to the frequency analyzer 18. As in the case of the first embodiment, the frequency analyzer 18 produces a complex signal composed of the I component signal (real part) and the Q component signal (imaginary part), and performs FFT (fast Fourier transform) on the complex signal so as to obtain its frequency spectrum. Subsequently, the frequency analyzer 18 detects the peak position of the frequency spectrum, obtains the Doppler frequency fd from the peak position, and measures the velocity v of the object from the Doppler frequency fd. Also, the frequency analyzer 18 determines the sign of the velocity from the sign (positive or negative) of the Doppler frequency fd. Of the frequency components of the I and Q component signals from the optical detectors 15A and 15B, the frequency component of the periodic signal is blocked by the BPFs 17A and 17B. Accordingly, the velocity and its direction can be measured with the same accuracy as that in the first embodiment.

The BPF 180, the BPFs 17A and 17B, the phase difference detector 200, and the frequency analyzer 18 are realized by, for example, a DSP. Therefore, the cost of the radar apparatus can be reduced by integrating these components and devices into a single chip.

As described above, the radar apparatus of the second embodiment can measure the distance and velocity of an object and the sign of the velocity at low cost and with high sensitivity and high accuracy.

Notably, the radar apparatus of the second embodiment may be modified as follows. Instead of the laser light output from the laser 10, the laser light received by the receiver 12 is subjected to the 90° phase shift performed by the $\pi/2$ phase shifter, and the resultant laser light and the laser light output from the laser without the phase shift are supplied to the mixer 13B for optical heterodyne detection so as to allow the optical detector 15B to produce the Q component signal.

Third Embodiment

Figure 4:
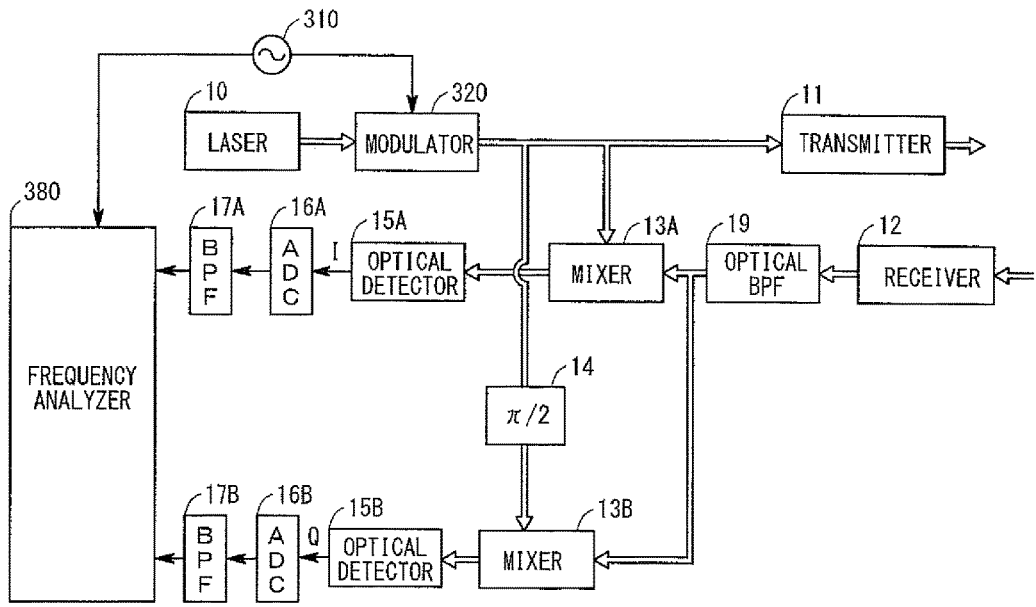
FIG. 4 is a diagram showing the configuration of a radar apparatus according to a third embodiment.

FIG. 4 is a diagram showing the configuration of a radar apparatus according to a third embodiment. The radar apparatus of the third embodiment differs from the radar apparatus of the first embodiment in that an oscillator 310 and a modulator 320 are added, and a frequency analyzer 380 is provided in place of the frequency analyzer 18. In the below, components different from those of the first embodiment will be described, and operation of the radar apparatus of the third embodiment will be described.

The oscillator 310 generates and outputs a triangular wave whose period is T. The modulator 320 frequency-modulates the laser light on the basis of the triangular wave from the oscillator 310, and outputs the modulated laser light. As a result, the frequency of the frequency-modulated laser light changes from the center frequency f0 (1550 nm) by $\Delta f$ in accordance with the triangular wave whose period is T. The laser light output from the modulator 320 is distributed and is input to the mixer 13A, the $\pi/2$ phase shifter 14, and the transmitter 11. Continuously changing periodic waves other than the triangular wave, for example, a saw-tooth wave and a sinusoidal wave can be used.

The laser light emitted from the transmitter 11 toward the object and reflected by the object is received by the receiver 12. The laser light received by the receiver 12 passes through the optical BPF 19, and is split into two light beams which are input to the mixers 13A and 13B.

The laser light from the modulator 320 and the laser light through the optical BPF 19 from the receiver 12 are input to the mixer 13A. The light signal produced as a result of mixing these laser lights is input to the optical detector 15A for optical heterodyne detection, whereby the light signal is converted to an electric signal (I component signal). This I component signal is a beat signal whose frequency is equal to the difference between the frequency of the laser light from the modulator 320 and the frequency of the laser light from the receiver 12. The frequency difference is produced due to a frequency shift caused by a delay corresponding to the distance to the object and a frequency shift caused by the Doppler effect. Therefore, the beat signal includes two frequency components in frequency increasing periods and frequency decreasing periods; i.e., fup=fr+fd, fdown=fr−fd. In these formulas, fr is the amount of frequency shift caused by the delay corresponding to the distance to the object, and fd is the Doppler frequency.

The laser light produced by shifting the phase of the laser light from the modulator 320 by 90° using the $\pi/2$ phase shifter 14 is input to the mixer 13B. Also, the laser light through the optical BPF 19 from the receiver 12 is input to the mixer 13B. The light signal produced as a result of mixing these laser lights is input to the optical detector 15B for optical heterodyne detection, whereby the light signal is converted to an electric signal (Q component signal). This Q component signal is also a beat signal whose frequency is equal to the difference between the frequencies of the input two laser lights.

The frequency analyzer 380 performs FFT on a complex signal composed of the I component signal (real part) and the Q component signal (imaginary part), to thereby calculates its frequency spectrum. The frequency spectrum has frequency peaks at fup and fdown. Accordingly, it is possible to calculate fup and fdown from the frequency spectrum and calculate the Doppler frequency fd by a formula of fd=(fup−fdown)/2. The velocity v of the object can be calculated from the Doppler frequency fd by using a formula of v=λ·fd/2, where λ is the wavelength of the laser light. Since the frequency analyzer 380 performs FFT on the complex signal, the frequency spectrum is calculated without being folded back even in a region where the sign of the frequency is negative. Accordingly, the sign of the velocity of the object can be determined from the sign (positive or negative) of the Doppler frequency fd.

Meanwhile, the value of fr can be calculated by using a formula of fr=(fup+fdown)/2. The distance R to the object can be calculated by using a formula of R=fr·c·T/(4Δf) where c is the velocity of light.

As described above, the radar apparatus of the third embodiment can measure the distance and velocity of the object and the sign of the velocity at low cost and with high sensitivity and high accuracy.

Various Modifications

The method of measuring the distance and velocity of the object is not limited to those of the second and third embodiments. A conventionally known arbitrary method can be used for distance measurement. Also, an arbitrary method can be used for velocity measurement so long as the method measures the velocity of the object from the Doppler frequency fd.

Figure 5:
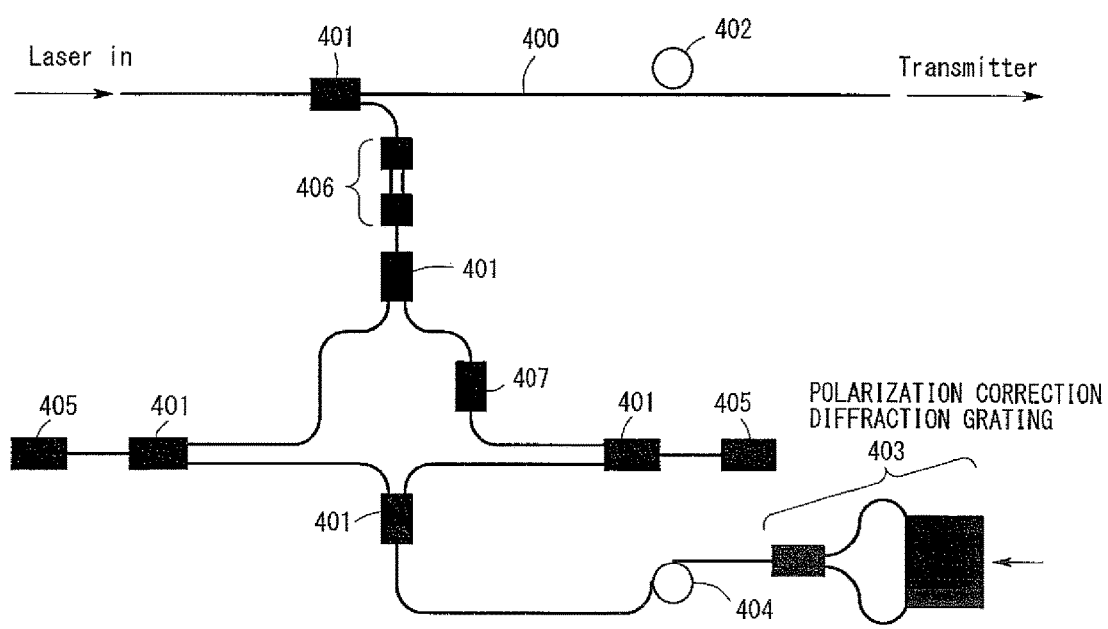
FIG. 5 is a diagram showing a modification of the radar apparatus of the second embodiment in which a portion of the radar apparatus is formed by an optical integrated circuit.

Also, in the radar apparatuses of the first through third embodiments, a portion for processing laser light may be configured by an optical integrated circuit. FIG. 5 shows an example configuration in which the laser light processing portion of the radar apparatus of the second embodiment is formed by an optical integrated circuit. The correspondence between the elements of the optical integrated circuit and the components of the second embodiment will be described.

Optical waveguides 400 for connecting components are line-shaped structures of Si formed on an SiO$_2$ substrate. Couplers 401 are used for branching and coupling of the optical waveguides 400. A ring modulator 402 are used as the modulator 120. The transmitter 11 is realized by a structure in which the laser light is radiated from an end surface of an optical waveguide 400 as is. A polarization correction diffraction grating 403 is used as the receiver 12. The state of polarization of the received laser light is corrected by the polarization correction diffraction grating 403 so as to realize proper coupling with the corresponding optical waveguide 400. A ring resonator 404 is used as the optical BPF 19. The π/2 phase shifter 14 is realized by a shifter 401 in which a heater is disposed on an optical waveguide, and a thermooptic effect is generated by the heat of the heater, whereby phase adjustment is performed. Photodiodes 405 are used for the optical detectors 15A and 15B. Also, a VOA (variable optical attenuator) 406 is inserted in the corresponding optical waveguide 400, whereby the intensity of the laser light input from the laser 10 to the photodiodes 405 can be adjusted.

As described above, the costs of the radar apparatuses of the first through third embodiments can be reduced by modularizing the laser light processing portion as an optical integrated circuit.

In the second and third embodiments, an external modulation scheme is used. In the external modulation scheme, the laser light output from the laser is modulated through use of a modulator is used. However, there can be used a direction modulation scheme in which the laser outputs laser light modulated by controlling the drive current of the laser.

The radar apparatus of the present invention can be used as an on-vehicle radar which detects pedestrians and vehicles travelling in front.

What is claimed is:

1. A vehicle radar apparatus which radiates laser light toward an object and detects and analyzes the laser light reflected by the object, comprising:
   a transmitter for radiating laser light toward the object, the laser light having an intensity modulated by a periodic signal having a frequency f0 lower than a lowest frequency at which the Doppler frequency fd produced as a result of movement of the object can be measured;
   a detector which includes a first detector for mixing received laser light and pre-transmission laser light so as to perform optical heterodyne detection, and a second detector for shifting the phase of one of the received laser light and the pre-transmission laser light by 90° and mixing the phase-shifted one laser light with the other laser light so as to perform optical heterodyne detection; and
   a frequency analyzer for producing a complex signal while using electric signals output from the first detector and the second detector as an I component signal and a Q component signal, obtaining a Doppler frequency fd through frequency analysis of the complex signal, and determining a sign of velocity of the object from a sign of the Doppler frequency fd; and
   a phase difference detector with a BPF (band pass filter) passing a band including the frequency f0 for detecting a phase difference between the periodic signal and a component with the frequency of f0 among the electric signal passed through the BPF to thereby measure a distance to the object;
   wherein the detector and the transmitter comprise an optical integrated circuit, the optical integrated circuit comprising an optical waveguide with line-shaped structures of Si formed on an SiO2 substrate, a first photodiode used for the first detector, a π/2 phase shifter and a second photodiode used for the second detector, a ring modulator used as an intensity modulator in the transmitter, a polarization correction diffraction grating for receiving laser light, and a ring oscillator used as an optical BPF which passes a band including a wavelength of the laser light wavelength, the π/2 phase shifter comprising the optical waveguide and a heater;
   wherein the wavelength of the laser light is set to a range of 800 to 1700 nm; and
   wherein the periodic signal is a cosine wave having a frequency f0 of 50 kHz to 500 kHz.

* * * * *